(12) United States Patent
Xie et al.

(10) Patent No.: US 7,974,169 B1
(45) Date of Patent: Jul. 5, 2011

(54) WOBBLE CHANNEL CLOCKING

(75) Inventors: Jin Xie, Longmont, CO (US); Jingfeng Liu, Longmont, CO (US)

(73) Assignee: Marvell International Ltd. (BM)

( * ) Notice: Subject to any disclaimer, the term of this patent is extended or adjusted under 35 U.S.C. 154(b) by 277 days.

(21) Appl. No.: 12/418,010

(22) Filed: Apr. 3, 2009

Related U.S. Application Data

(60) Provisional application No. 61/048,793, filed on Apr. 29, 2008.

(51) Int. Cl.
*G11B 7/00* (2006.01)

(52) U.S. Cl. .................. 369/59.19; 369/59.21

(58) Field of Classification Search .......... None
See application file for complete search history.

(56) References Cited

U.S. PATENT DOCUMENTS

| | | | |
|---|---|---|---|
| 6,188,738 B1 * | 2/2001 | Sakamoto et al. | 375/371 |
| 6,975,569 B2 * | 12/2005 | Tada et al. | 369/47.28 |
| 6,982,939 B2 * | 1/2006 | Powelson et al. | 369/47.53 |
| 7,002,895 B1 | 2/2006 | Taussig | |
| 7,310,296 B2 | 12/2007 | Dai | |
| 2008/0253249 A1 | 10/2008 | Lee et al. | |
| 2008/0273430 A1 | 11/2008 | Serrano et al. | |

\* cited by examiner

*Primary Examiner* — Peter Vincent Agustin

(57) ABSTRACT

Devices, systems, methods, and other embodiments associated with wobble channel clocking are described. In one embodiment, an apparatus implemented with a clock generator, a clock scaling logic, radio frequency channel logic, and wobble channel log. The clock generator generates a clocking signal. The clock scaling logic scales the clocking signal to produce a scaled clocking signal. The radio frequency channel logic at least partially decodes a digital radio frequency signal from an optical disk. The wobble channel logic at least partially decodes a digital wobble signal from the optical disk. Either the clocking signal or the scaled clocking signal is used to clock the radio frequency channel logic, and the other clocking signal or the scaled clocking signal is used to clock the wobble channel.

16 Claims, 5 Drawing Sheets

WOBBLE CHANNEL CLOCKING

CROSS REFERENCE TO RELATED APPLICATIONS

This application claims the benefit of U.S. provisional application Ser. No. 61/048,793, filed on Apr. 29, 2008, which is hereby incorporated by reference.

BACKGROUND

Writable optical digital video disks (DVDs) store information on the DVDs in two different manners. Data information is recorded onto tracks as a DVD spins. The tracks spiral around the center of the DVD in a sinusoid pattern called the wobble pattern. A second type of information called wobble information is encoded in the wobble pattern.

Information related to addresses used to store information on the data tracks is stored in the wobble pattern. Timing information needed to generate a write clock for writing the optical disk is also stored in the wobble pattern. The data information and wobble information are typically read and processed independent from each other. For example, different hardware, sensors, and demodulation techniques are used to read the data information and the wobble information. Additionally, typically the data information and the wobble information are read at different bit rates. The data information and wobble information are usually decoded using different modulation techniques.

SUMMARY

An embodiment includes an apparatus implemented with one clock generator, a clock scaling logic, radio frequency channel logic, and wobble channel log. The clock generator generates a clocking signal. The clock scaling logic scales the clocking signal to produce a scaled clocking signal. The radio frequency channel logic at least partially decodes a digital radio frequency signal from an optical disk. The wobble channel logic at least partially decodes a digital wobble signal from the optical disk. Either the clocking signal or the scaled clocking signal is used to clock the radio frequency channel logic, and the other clocking signal or the scaled clocking signal is used to clock the wobble channel.

Another embodiment includes an apparatus implemented with radio frequency channel logic that decodes, at least partially, RF data at an radio frequency bit rate. The RF channel logic is clocked by a first clocking signal. The apparatus includes scaling logic that generates a scaled second clocking signal based, at least in part, on the first clocking signal. The apparatus further includes wobble channel logic comprised of interpolator logic and digital wobble logic. The interpolator logic generates interpolated wobble data associated with wobble data read from an optical disk. The interpolator logic is clocked by the scaled second clocking signal. The digital wobble logic decodes, at least partially, the interpolated wobble data. The digital wobble logic is clocked with the scaled second clocking signal.

Another embodiment includes a method that generates a first clocking signal. A radio frequency data read from an optical disk is sampled to produce digital radio frequency data. The sampling of the radio frequency data is controlled, at least in part, by the first clocking signal. The first clocking signal is scaled to generate a second clocking signal. Wobble data read from the optical disk is sampled to produce digital wobble data. The sampling of the wobble data is controlled, at least in part, by the second clocking signal.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
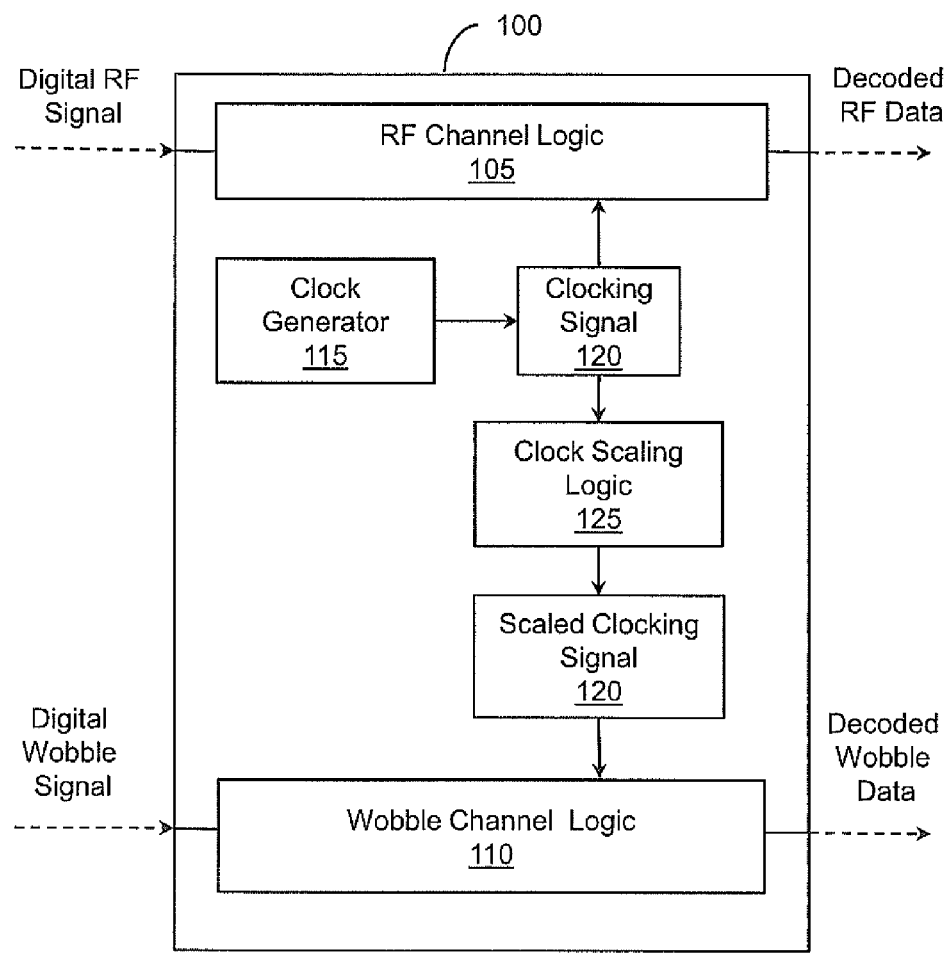
FIG. 1 illustrates an embodiment of an apparatus associated with wobble channel clocking.

Described herein are example systems, methods, and other embodiments associated with processing information from an optical disk. A data channel reads data from the optical disk at a different data rate than a wobble channel reads wobble information from the optical disk. A clock generator in the data channel creates a clock for synchronizing the data channel. The clock is scaled to create a scaled clock that runs at a different speed (e.g. a slower speed) relative to the unscaled clock. The scaled clock is used to synchronize the wobble channel. Therefore, even though the data channel and wobble channel process data at different rates, a single clock is used to clock both channels.

In one embodiment, an apparatus is implemented with a radio frequency (RF) channel that decodes, RF data at an RF bit rate. The RF data corresponds to data that is to be read from an optical disk (e.g., a digital video disk (DVD)). The RF channel logic is clocked by an RF clock. Scaling logic scales the RF clock to a scaled RF clock that operates at a lower frequency than the RF clock. In one embodiment, a wobble channel within the apparatus is implemented with interpolator logic and digital wobble logic. The wobble channel is clocked by the scaled RF clock. The interpolator logic generates interpolated data based, at least in part, on wobble data read from the optical disk. The digital wobble logic decodes, the interpolated wobble data. The interpolator logic and the digital wobble logic are clocked with the scaled RF clock. Both channels are clocked with versions of the same clock so that one clock generator is used instead of two clock generators. Information can be more easily exchanged between the RF channel and the wobble channel because the channels are in the same clock domain.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may. In addition, features described in connection with one particular embodiment may be applied to other embodiments.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD) or DVD, other optical medium, a random access memory (RAM), a read only memory (ROM), a memory chip or card, a memory stick, and other media from which a computer, a processor or other electronic device can read.

"Logic", as used herein, includes but is not limited to hardware, firmware, software stored or in execution on a machine, and/or combinations of each to perform a function (s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 1 illustrates one embodiment of an apparatus 100 that is configured to read information from an optical disk. The information may read from a variety of disks such as a digital video disk (DVD), a compact disk (CD), a Blu-Ray disk, or another kind of disk. The information read from the optical disk includes RF data and wobble data. The apparatus 100 is implemented with RF channel logic 105 to process the RF data and a wobble channel logic 110 to process the wobble data. The apparatus 100 is comprised of a clock generator 115 that creates a clocking signal 120. The clock generator 115 may be a time base clock generator. The clocking signal is used to clock the RF channel logic 105.

Clock scaling logic 125 is configured to scale the clocking signal 120 to generate a scaled clocking signal 130. In one embodiment, the scaled clocking signal 130 is generated to operate at a lower frequency than the clocking signal 120. The wobble channel logic 110 is clocked by the scaled clocking signal 130. Rather than clocking the RF channel logic 105 and the wobble channel logic 110 with clocks generated from different clock generators, the channels are clocked with different scaled versions of the same clocking signal 120 generated by the clock generator 115. Using a single clock generator saves hardware and reduces power. The clocking signal 120 and the scaled clocking signal 130 may correspond to an RF clock and a scaled RF clock. In one embodiment, the clock generator 115 is controlled by a phased-locked loop (PLL) as discussed below.

It will be appreciated that the clock scaling can be reversed. In a general embodiment, a single clock is used to generate clocking signals. The clock scaling logic 125 scales the clock to produce scaled clocking signals. The RF channel logic 105 is configured to be clocked by one of the clocking signals and the wobble channel logic 110 is configured to be clocked by the other clocking signal.

In another embodiment, the apparatus 100 is implemented with a single time base generator that is configured to generate a wobble clock. The wobble clock is used to clock the wobble channel logic 110. The clock scaling logic 125 is configured to scale the wobble clock to a scaled wobble clock. The clock scaling logic 125 may be configured to scale the frequency of the scaled wobble clock to a frequency that is greater than that of the wobble clock. The scaled wobble clock then can be used to clock the RF channel logic 105.

The RF channel logic 105 is to decode RF data from the optical disk and the wobble channel logic 110 is to decode wobble data read from the optical disk. In one embodiment, the wobble channel logic 110 decodes the wobble data at a different bit rate than the RF channel logic 105 decodes the RF data. The decoding may involve demodulating the RF data and/or the wobble data. The data is demodulated since demodulation and/or decoding may involve one or more additional actions for processing, decoding, and/or demodulating the RF data and the wobble data as understood by those of ordinary skill in the art. It will be appreciated that these additional actions may or may not be included in this embodiment of the apparatus 100.

The RF data and wobble data correspond to data that is received or read from the optical disk with sensors. The sensors read the optical disk and create an analog RF signal and an analog wobble signal based on information read from the optical disk. In one embodiment, the apparatus 100 includes RF and wobble analog-to digital converters (ADCs). The RF ADC is clocked by the clocking signal 120 and the wobble ADC is clocked by the scaled clocking signal 130. The RF ADC samples the analog RF signal to create a digital RF signal and the wobble ADC samples the analog wobble signal to create a digital wobble signal. The RF channel logic 105 functions to decode the digital RF data and the wobble channel logic 110 functions to decode the digital wobble signal.

In another embodiment, the apparatus 100 is configured to process digital data that has already been sampled or preprocessed. The apparatus 100 is implemented with an input logic to receive a digital RF signal and a digital wobble signal. The digital RF signal is a digital representation of an RF signal from an optical disk and the digital wobble signal is a digital representation of a wobble signal from the optical disk.

In one embodiment, the wobble channel logic 110 is implemented with interpolator logic that is clocked by the scaled clocking signal 130. The interpolator logic is configured to generate interpolated wobble data that is derived from the digital wobble signal. Interpolation may involve the calculation of a data value for a time where data is unavailable. Data that is unavailable may be interpolated (e.g., estimated) based, at least in part, on other samples previously received. For example, the interpolator may generate an interpolated wobble data value by taking a weighted average value of two digital wobble signals adjacent to the value to be interpolated. In another example, the interpolator logic is configured to scale the adjacent values based, at least in part, on a distance to the value to be interpolated before an average value of the adjacent values is calculated.

The sampling rate of wobble data can be slower than the RF clock rate with no loss of information. This is because the sampled wobble data has a smaller bandwidth than RF data. In one embodiment, the sampling rate of the wobble data is determined based on how the wobble data was encoded (e.g., what protocol or encoding format). For example, consider a normalized sampling rate of RF data of 1. For a given wobble data sampling rate 1/N (N is a positive integer) the scaled clocking signal 130 is scaled to be faster than 1/N.

For data stored according to the DVD+ standard, an interpolation period of the DVD+ is 32T, where T=1 is the sampling rate of the RF data. According to sampling theory, for DVD+ wobble data, it may be possible to sample the wobble data at a rate as slow as ⅛ (N=8). To achieve N=8, M is to be selected so that M is less than 8, where M corresponds to the frequency of the scaled clocking signal 130. In this example, M can be any value of 1, 2, 3, 4, 5, 6, or 7. Similarly, if N is chosen as N=4, then M can be 1, 2, or 3. If N is chosen N=2, then M is 1.

Figure 2:
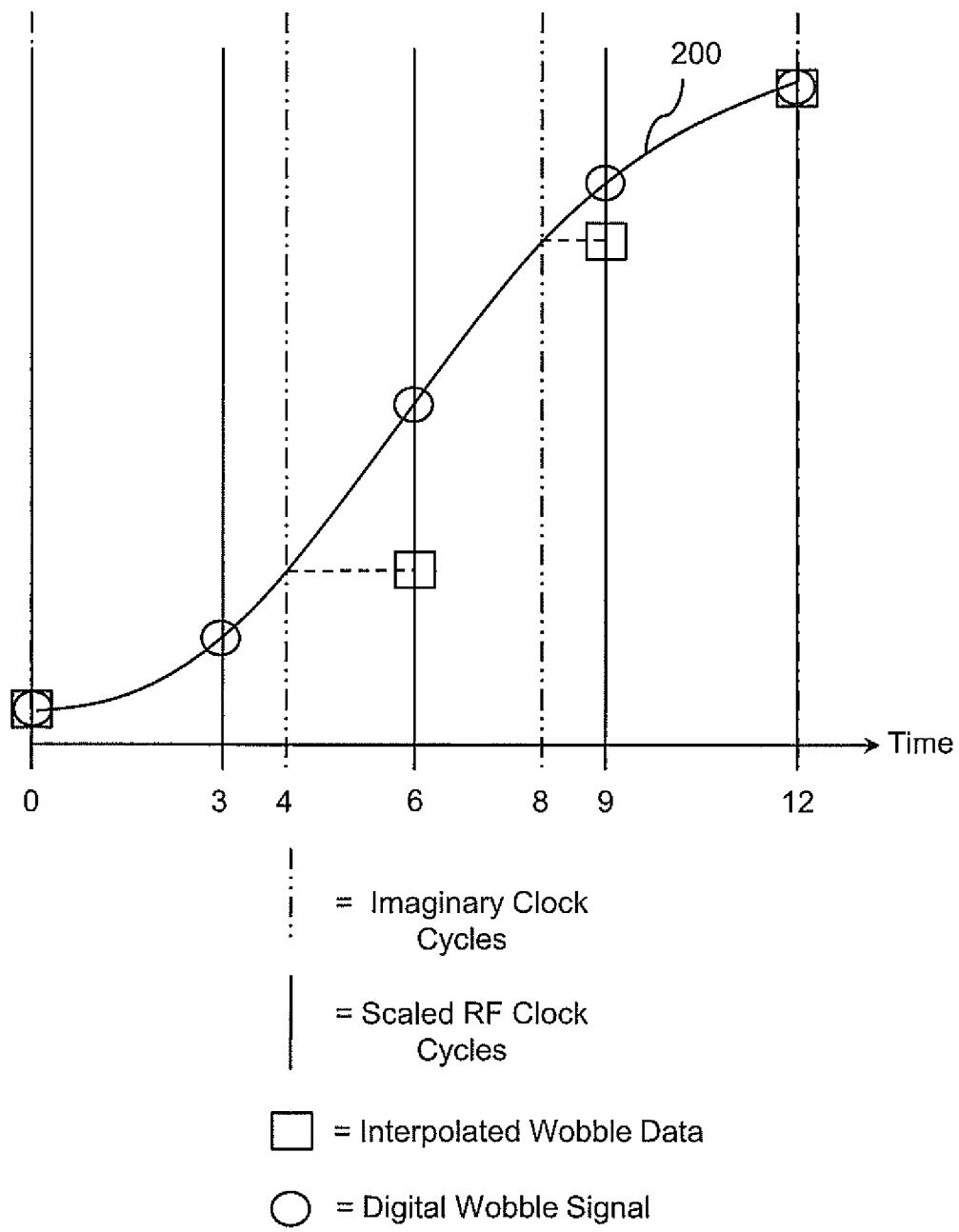
FIG. 2 illustrates one embodiment of interpolating wobble data samples associated with wobble channel clocking.

FIG. 2 illustrates one embodiment of how wobble data 200 can be sampled and interpolated. In FIG. 2, M is 3 and N is 4. Of course, other values can be used. There are no phase errors shown in FIG. 2. Phase errors will be discussed below. The wobble data 200 is sampled periodically by the scaled clocking signal 130 as discussed above. For example, in FIG. 2, the wobble data may be sampled at the rising edges of the scaled clocking signal 130. The wobble data is sampled at time 0, 3, 6, 9, etc. In one embodiment, the sampling may be performed by the wobble ADC.

In one embodiment, the interpolator logic is configured to provide interpolated wobble data to digital wobble logic for further processing, decoding, and/or demodulation. The digital wobble logic processes interpolated wobble data at periodic rate that is slower than the scaled RF clock period. In general, the interpolator logic ideally would receive sampled data at times 0, 4, 8, 12, 16, etc, of FIG. 2. These times are periodic with a period that will be referred to herein as an interpolation period. In FIG. 2, the interpolation period corresponds to the imaginary clock cycles of an imaginary clock. The imaginary clock is not actually generated; however, the imaginary clock shows desired times that the digital wobble logic may be triggered to process interpolated wobble data.

FIG. 2 shows one example where the interpolation period is greater than the period of the scaled clocking signal 130. However, digital wobble signals may not be available at the interpolation period times of 0, 4, 8, 12, 16, etc. Therefore, the interpolator logic provides interpolated wobble data at the scaled RF clock period following the interpolation period time where the digital wobble signal was not available.

In the graph of FIG. 2, at time 0, an imaginary clock cycle is aligned with a scaled RF clock cycle so the interpolator is configured to output the digital wobble signal at time 0 to the digital wobble logic. Providing data to the digital wobble logic is also known as triggering the digital wobble logic. At time 3, a digital wobble sample is available; however, the interpolator logic is configured to not output an interpolated wobble data to the digital wobble logic because the digital wobble logic does not input data until time point 4.

At time point 4, the interpolator logic responds by outputting an interpolated wobble data to the digital wobble logic; however no digital wobble sample is available at time 4. Additionally, the start of the interpolator period does not correspond to the start of a scaled RF period at time 4. The digital wobble logic is not triggered at time 4. Instead the interpolator waits until another digital wobble sample arrives at time 6. The interpolator logic is configured to interpolate a digital wobble sample at time 6 based, at least in part, on digital wobble samples taken at times 3 and 6. This interpolated wobble sample is output at time 6 and the digital wobble logic is triggered at time 6. The interpolated wobble data is determined by the interpolator logic at time 6 is based, at least in part, on two sequentially adjacent digital wobble signals of a string of digital wobble signals. The adjacent wobble digital wobble signals are averaged and/or scaled as discussed above to generate an interpolated wobble value. In other embodiments, the interpolated wobble data may be based other digital wobble samples.

With continued reference to FIG. 2, at time point 8, the interpolator logic outputs interpolated wobble data to the digital wobble logic, but no digital wobble sample is available. The interpolator logic is configured to wait until time 9 and to then use digital wobble samples taken at time 6 and time 9 to estimate interpolated wobble data for time 8. The digital wobble logic is triggered at time 9 and a current interpolated wobble data is output to the digital wobble logic at time 9. At time 12, the imaginary clock cycle is aligned with a scaled RF clock cycle so the interpolator is configured to output the digital wobble signal at time 0 and to trigger the digital wobble logic at time 12. At future times, the interpolator logic is configured to interpolate digital wobble data similar to how the digital wobble data was interpolated from time 0 to time 12. The illustrated time points are only examples and that actual implementation of the apparatus may produce different scenarios of time responses.

In another embodiment of apparatus 100 of FIG. 1, the RF channel logic 105 may comprise an RF phase-locked loop (PLL) (not shown) to determine a phase error of the clocking signal 120. The RF PLL can be configured to compare the frequencies of the clocking signal 120 to a reference frequency and produces the phase error that is proportional to the difference between frequencies. The clock generator 115 is configured to compensate, at least in part, the clocking signal 120 for the phase error. The clock generator 115 may drive a voltage controlled oscillator with the phase error to compensate for the phase error of the clocking signal 120.

In one embodiment, the wobble channel logic 110 further comprises a digital PLL (not shown). The digital PLL is configured to detect a phase difference between a data rate of the interpolated wobble data and an ideal data rate. The interpolator logic corrects the data rate of the interpolated wobble data based, on the phase difference. The digital phase-locked loop may be clocked by the scaled clocking signal 130.

Figure 3:
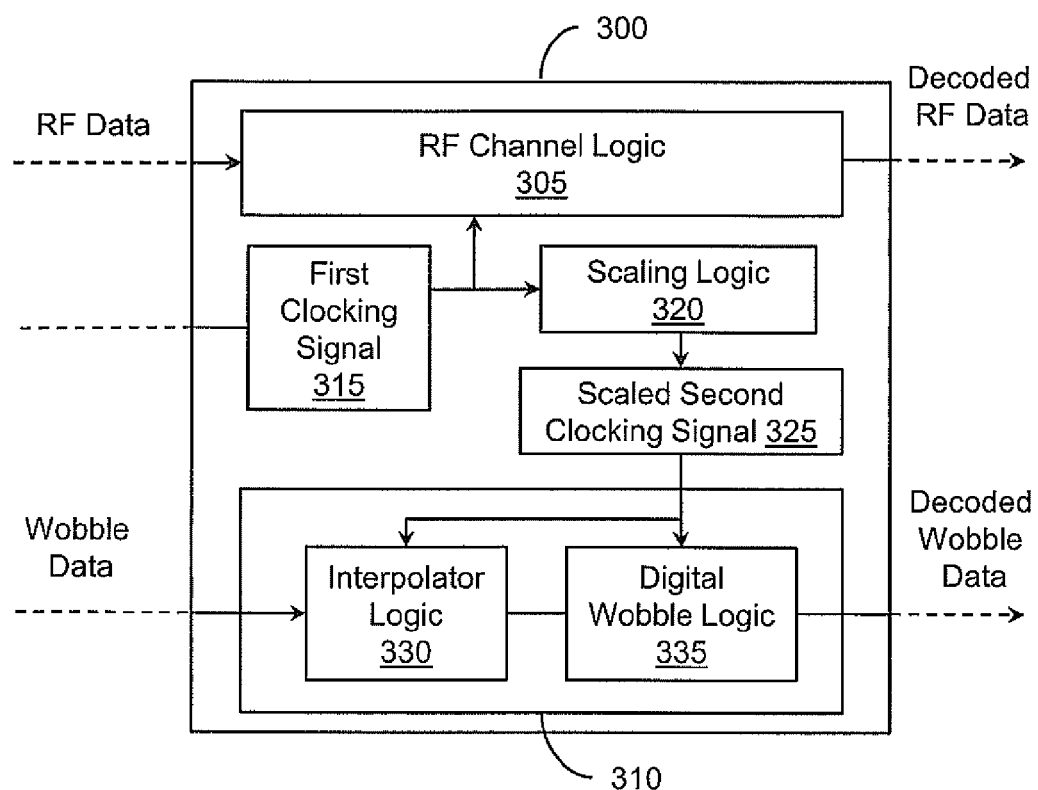
FIG. 3 illustrates another embodiment of an apparatus associated with wobble channel clocking.

FIG. 3 illustrates one embodiment of an apparatus 300 that processes information read from an optical disk. The apparatus 300 at least partially demodulates RF data received at RF channel logic 305 and wobble data received at wobble channel logic 310. The RF channel logic 305 and the wobble channel logic 310 are controlled by clocks of a single clock domain. The apparatus 300 may operate similar to apparatus 100 of FIG. 1 in one or more ways. In one embodiment, the apparatus 300 is implemented as chip that may operate in an optical disk drive.

In one embodiment, the RF channel logic 305 decodes, at least partially, RF data at an RF bit rate. The decoding may involve at least partially demodulating the RF data or transforming the RF data into another useful format. The demodulation and/or decoding may involve one or more steps for processing the RF data as previously stated. The RF channel logic 305 is clocked by a first clocking signal 315. The RF bit rate corresponds to the period of the first clocking signal 315.

The apparatus 300 is implemented with scaling logic 320 configured to convert the first clocking signal 315 to a second clocking signal 325. The wobble channel logic 310 is clocked by the second clocking signal 325. In one embodiment, the scaling logic 320 scales the first clocking signal 315 by down sampling the first clocking signal 315 to a lower frequency. In another embodiment, the apparatus 300 receives a wobble clock rather than a first clocking signal 315 and the scaling logic 320 scales the wobble clock to create a scaled wobble clock. In this embodiment, the RF channel logic 305 is then clocked by the scaled wobble clock.

With continued reference to FIG. 3, the wobble channel logic 310 is comprised of interpolator logic 330 and digital wobble logic 335. The interpolator logic 330 and digital wobble logic 335 assist the wobble channel logic 310 with at least partially decoding and/or demodulating wobble data received from the optical disk. The interpolator logic 330 and the digital wobble logic 335 are clocked by the second clocking signal 325.

In one embodiment, the interpolator logic 330 is configured to generate interpolated wobble data associated with wobble data read from an optical disk. The interpolator logic 330 generates at least some of the interpolated wobble data based, at least in part, on adjacent values of the wobble data. The adjacent values are scaled and/or averaged to calculate an interpolated wobble data value as discussed above. Other calculations and different amounts of wobble data may be used by the interpolator logic 330 to generate interpolated wobble data values.

In one embodiment, the interpolator logic 330 is configured to receive the wobble data from an A-to-D converter (ADC) at a periodic rate. The ADC is clocked by the second clocking signal 325. As discussed above with reference to FIG. 2, the interpolated wobble data corresponds to and is calculated from wobble data values of a string of wobble data values associated with the wobble data. The wobble data values are periodic and the interpolation period corresponds to time when the wobble data values are generated.

As shown in FIG. 2, the interpolator logic 335 generates interpolated wobble data values so that one interpolated wobble data value can be generated in one interpolation period. The first clocking signal 315 may correspond to an RF clock and the second clocking signal 325 my correspond to a scaled RF clock. An interpolated wobble data value may not be generated for every RF clock period. The interpolation period may be greater than the scaled RF clock period. In one embodiment, an integer number of interpolation periods equals an integer number of scaled RF clock periods. The integer number of interpolation periods is less than the integer number of scaled RF clock periods.

In one embodiment, the digital wobble logic 335 is implemented with phase logic (not shown). The phase logic is configured to detect a phase change associated with values of the interpolator wobble data and to generate a phase offset signal. The phase logic may correspond to a PLL that compares the frequencies of the interpolator wobble data to a reference frequency and produces the phase offset signal that is proportional to the difference between the frequencies. The interpolator logic 330 changes the phase of the interpolated wobble data values based, at least in part, on the phase offset signal to eliminate the phase change. The interpolator logic 330 may be driven by a voltage controlled oscillator with a voltage representing the phase error to compensate for the phase error associated with the interpolator wobble data.

Figure 4:
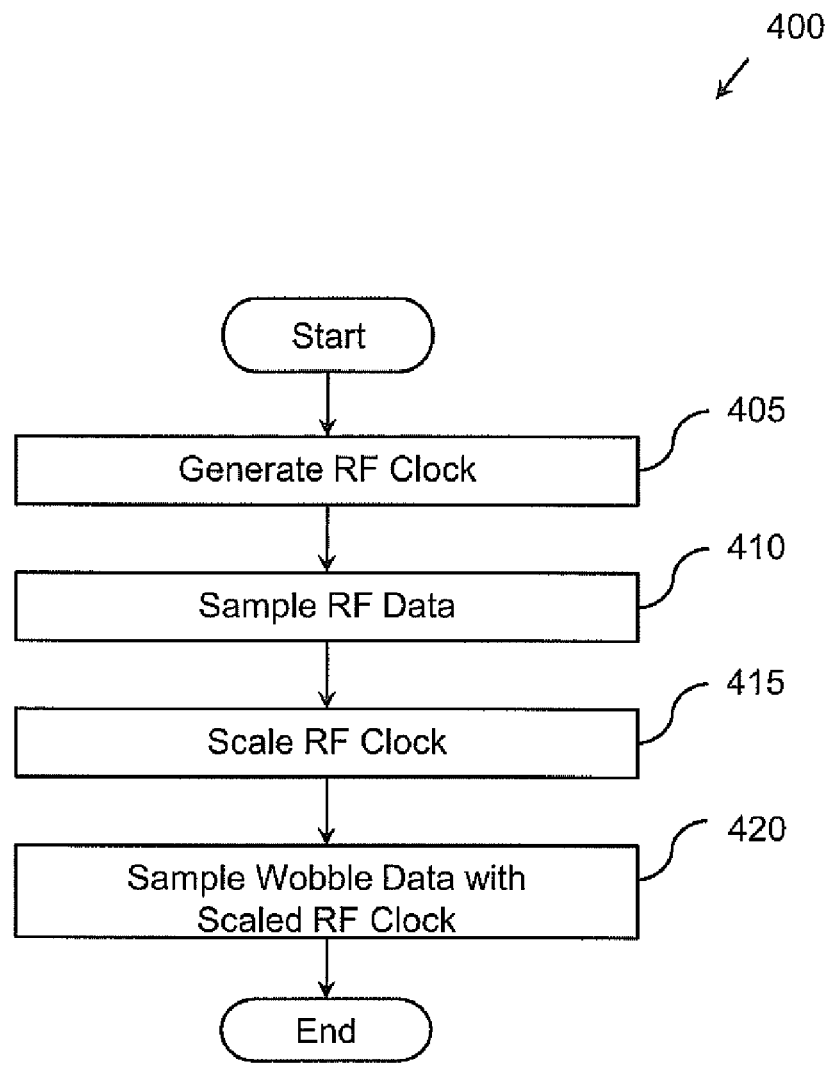
FIG. 4 illustrates one embodiment of a method associated with wobble channel clocking.

FIG. 4 illustrates an embodiment of a method 400 associated with wobble channel clocking. The method 400 may improve the reading of information from an optical disk by clocking the wobble channel with a clock derived from an RF channel clock, or vice versa. By clocking the wobble channel with a clock derived from the RF channel clock, the wobble channel and the RF channel are clocked with the same clock domains. Data may be more easily exchanged between the RF channel and the wobble channel that are clocked in the same clock domains rather than different clock domains. In another embodiment, an RF channel may be clocked by clocking signals derived from a wobble channel clock.

The method 400 may process, convert, decode, and/or demodulate data in the wobble channel and the RF channel into another data format. The method 400 may comprise a portion of the steps needed to process, convert, decode, and/or demodulate data into another data format.

The method 400 begins by generating an RF clock at 405. The RF clock may be generated by digital logic and/or analog logic. The RF clock may be generated by other suitable methods. For example, the RF clock may be generated by a time based generator.

RF data is sampled, at 410, to produce digital RF data. The RF data is sampled after the RF data is read from an optical disk. The sampling of the RF data is controlled, at least in part, by the RF clock. The RF clock is scaled, at 415, to generate a scaled RF clock. The clock may be scaled by frequency division, by digital logic, and/or other scaling methods.

Wobble data read from the optical disk is sampled, at 420, to produce digital wobble data. Analog data read from the optical disk may be sampled to determine analog values. The analog values are converted to digital values that represent at least some of the digital wobble data. The sampling, at 420, of the wobble data is controlled, at least in part, by the scaled RF clock. The digital wobble data may be produced at the scaled RF clock rate. It will be appreciated that the actions of method 400 can occur in different orders and/or some actions can occur in parallel.

In another embodiment, the sampling of wobble data at 420 can include generating interpolated wobble data from the digital wobble data. One value of interpolated wobble data may be generated per an interpolation period. The interpolation period may correspond to a rate a digital channel logic is to at least partially demodulate the wobble data. In one embodiment, the interpolation period is greater than a period of the scaled RF clock.

In one embodiment, the digital wobble data is a sequence of wobble data values. At least some of the interpolated wobble values are generated based, at least in part, on adjacent wobble data values. The adjacent wobble data value may be scaled and averaged together as discussed above.

In another embodiment, the interpolated wobble data is at least partially decoded and/or demodulated to produce decoded wobble data. A phase difference between the interpolated wobble data and the decode wobble data may be determined. The phase difference may be determined by a PLL comparing the frequency of the interpolator wobble data to a reference frequency to determine the phase difference proportional to the difference between frequencies. The interpolated wobble data is compensated to adjust for the phase difference. The phase difference may be compensated for by driving a voltage controlled oscillator with the phase difference. The voltage controlled oscillator controls the frequency so that the interpolator wobble data is generated with the phased difference is removed.

The methods herein may be implemented as computer executable instructions embodied and stored on a computer-readable medium. When executed by a machine (e.g., processor, device) the instructions cause the machine to perform the methods herein and their equivalents. In other embodiment, the methods may be implemented in a semiconductor chip. The methods can also be implemented with one or more circuits, logic devices, firmware, and/or combinations of these.

Figure 5:
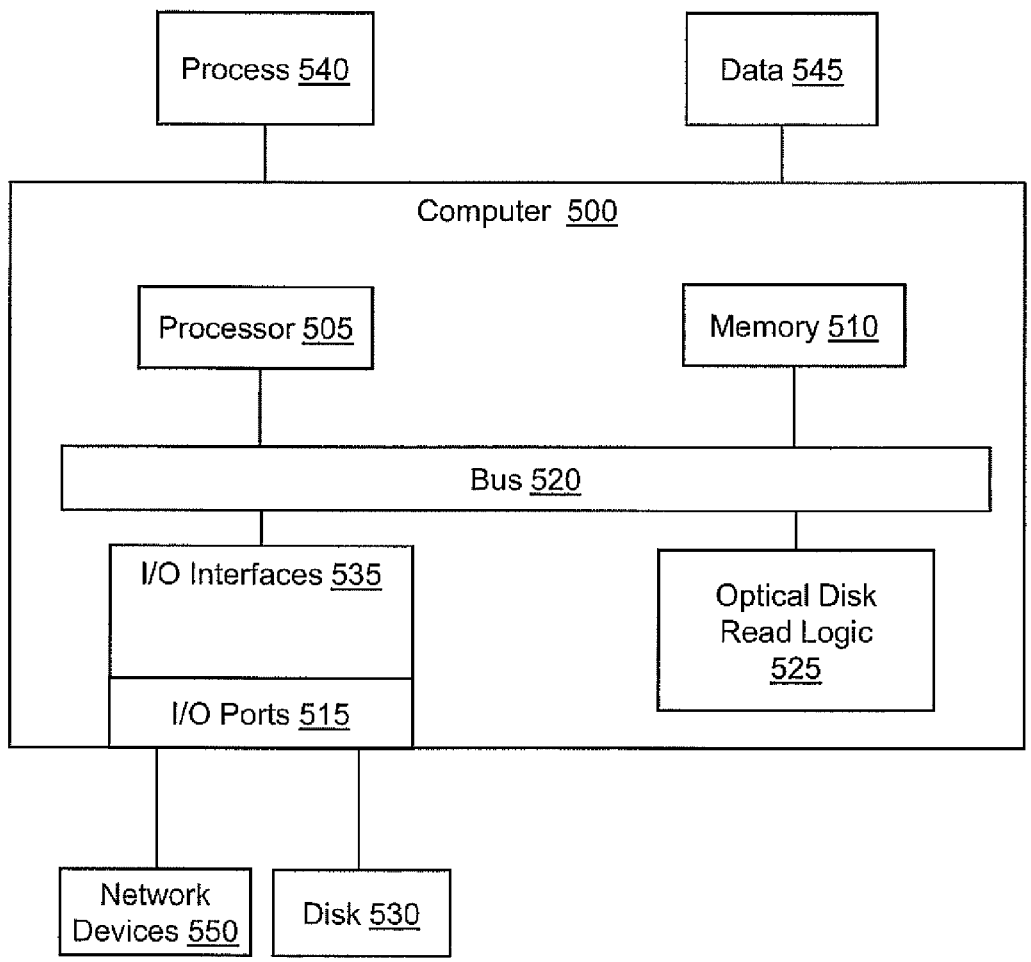
FIG. 5 illustrates an embodiment of a computing environment in which example systems and methods, and equivalents associated with wobble channel clocking may operate.

FIG. 5 illustrates one embodiment of an example computer 500 in which example systems and methods described herein, or equivalents, can be implemented. The example computer 500 comprises a processor 505, a memory 510, and input/output ports 515 operably connected by a bus 520. In one example, the computer 500 is implemented with optical disk read logic 525 configured to read an optical disk.

The optical disk read logic 525 provides means (e.g., hardware, stored software, and firmware) to process RF data and wobble data with clocks derived from the same clock generator. The optical disk read logic 525 can be implemented similar to apparatus 100 of FIG. 1, apparatus 300 of FIG. 3 and/or combinations of their features. The optical disk read logic 525 can include logic implemented, for example, as an ASIC or other type of circuit.

Generally describing an example configuration of the computer 500, the processor 505 may be a variety of various processors including dual microprocessor and other multi-processor architectures. A memory 510 may include volatile memory and/or non-volatile memory. Non-volatile memory may include, for example, read-only memory (ROM), programmable read only memory (PROM), erasable programmable read only memory (EPROM), electronically erasable programmable read only memory (EEPROM), and so on. Volatile memory may include, for example, random access memory (RAM), static random access memory (SRAM), dynamic random access memory (DRAM), and so on.

A disk 530 may be operably connected to the computer 500 via, for example, through an input/output interface (e.g., card, device) 535 and the input/output port 515. The disk 530 may be, for example, a magnetic disk drive, a solid state disk drive, a floppy disk drive, a tape drive, a Zip drive, a flash memory card, a memory stick, and so on. Furthermore, the disk 530 may be a compact disk read-only memory (CD-ROM) drive, a compact disk recordable (CD-R) drive, a compact disk rewritable (CD-RW) drive, a digital video disk read-only memory (DVD ROM), and so on. The memory 510 can store a process 540 and/or a data 545, for example. The disk 530 and/or the memory 510 can store an operating system that controls and allocates resources of the computer 500.

The bus 520 may be a single internal bus interconnect architecture and/or other bus or mesh architectures. While a single bus is illustrated, it is appreciated that the computer 500 may communicate with various devices, logics, and peripherals using other busses (e.g., peripheral component interconnect express (PCIE), 1394, universal serial bus (USB), Ethernet). The bus 520 can be types including, for example, a memory bus, a memory controller, a peripheral bus, an external bus, a crossbar switch, and/or a local bus.

The computer 500 may interact with input/output devices via the input/output (I/O) interfaces 535 including the optical disk read logic 525 and the input/output ports 515. Input/output devices may be, for example, a keyboard, a microphone, a pointing and selection device, cameras, video cards, displays, the disk 530, the network devices 550, and so on. The input/output ports 515 may include, for example, serial ports, parallel ports, and USB ports.

The computer 500 can operate in a network environment and thus may be connected to the network devices 550 via the I/O interfaces 535, and/or the I/O ports 515. Through the network devices 550, the computer 500 may interact with a network. Through the network, the computer 500 may be logically connected to remote computers. Networks with which the computer 500 may interact include, but are not limited to, a local area network (LAN), a wide local area network (WLAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. For example, one or more steps of methods described above may be performed in a different order (or concurrently) to achieve desirable results. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
a clock generator to generate a clocking signal;
clock scaling logic to scale the clocking signal to produce a scaled clocking signal;
radio frequency channel logic to at least partially decode a digital radio frequency signal from an optical disk; and
wobble channel logic to at least partially decode a digital wobble signal from the optical disk;
wherein one of the clocking signal or the scaled clocking signal is used to clock the radio frequency channel logic, and the other one of the clocking signal or the scaled clocking signal is used to clock the wobble channel.

2. The apparatus of claim 1, wherein the wobble channel logic further comprises:
interpolator logic to generate interpolated wobble data based, at least in part, on the digital wobble signal; and
digital wobble logic to at least partially decode the interpolated wobble data.

3. The apparatus of claim 2, wherein the wobble channel logic further comprises:
a digital phase-locked loop to detect a phase difference between a data rate of the interpolated wobble data and an ideal data rate,
wherein the interpolator logic is to correct the data rate of the interpolated wobble data based on the phase difference.

4. The apparatus of claim 1, wherein the wobble channel logic further comprises:
interpolator logic to generate interpolated wobble data based, at least in part, the digital wobble signal,
wherein the interpolator logic generates at least some of the interpolated wobble data based, at least in part, on two sequentially adjacent digital wobble signals of a string of digital wobble signals.

5. The apparatus of claim 1, further comprising:
a first analog-to-digital converter to sample an analog radio frequency signal to produce the digital radio frequency signal, wherein the first analog-to-digital converter is clocked by the clocking signal that clocks the radio frequency channel logic; and
a second analog-to-digital converter to sample an analog wobble signal to produce the digital wobble signal, wherein the second analog-to-digital converter is clocked by the clocking signal that clocks the wobble channel logic.

6. The apparatus of claim 1, wherein the wobble channel logic is to decode the digital wobble signal at a different bit rate than the radio frequency channel logic is to decode the digital radio frequency signal.

7. The apparatus of claim 1, further comprising:
input logic to receive a digital radio frequency signal and a digital wobble signal, wherein the digital radio frequency signal is digital representation of an radio frequency signal from the optical disk and the digital wobble signal is a digital representation of a wobble signal from the optical disk.

8. An apparatus, comprising:
radio frequency channel logic to decode, at least partially, radio frequency data at an radio frequency bit rate, wherein the radio frequency channel logic is clocked by a first clocking signal;
scaling logic to generate a scaled second clocking signal based, at least in part, on the first clocking signal; and
wobble channel logic comprised of:
interpolator logic to generate interpolated wobble data associated with wobble data read from an optical disk, wherein the interpolator logic is clocked by the scaled second clocking signal; and
digital wobble logic to decode, at least partially, the interpolated wobble data, wherein the digital wobble logic is clocked with the scaled second clocking signal.

9. The apparatus of claim 8, wherein the digital wobble logic further comprises:
phase logic to detect a phase change associated with values of the interpolator wobble data and to generate a phase offset signal, wherein the interpolator logic adjusts the phase of the interpolated wobble data values based, at least in part, on the phase offset signal to eliminate the phase change.

10. The apparatus of claim 8, wherein interpolator logic is to generate at least some of the interpolated wobble data based, at least in part, on adjacent values of the wobble data.

11. The apparatus of claim 8, wherein the interpolator logic is to receive the wobble data from an analog-to-digital converter that is clocked by the scaled second clocking signal.

12. The apparatus of claim 8, wherein the scaling logic generates the scaled second clocking signal by down sampling the first clocking signal to a lower frequency.

13. A method, comprising:
generating a first clocking signal;
sampling radio frequency data read from an optical disk to produce digital radio frequency data, wherein the sampling of the radio frequency data is controlled, at least in part, by the first clocking signal;
scaling the first clocking signal to generate a second clocking signal; and
sampling wobble data read from the optical disk to produce digital wobble data, wherein the sampling of the wobble data is controlled, at least in part, by the second clocking signal.

14. The method of claim 13, wherein sampling the wobble data comprises:
sampling analog data read from the optical disk to determine an analog value; and
converting the analog value to a digital values that represent at least some of the digital wobble data.

15. The method of claim 13, wherein the digital wobble data is a sequence of wobble data values and the method further comprises:
generating interpolated wobble values, wherein at least some of the interpolated wobble values are generated based, at least in part, on adjacent wobble data values.

16. The method of claim 13, further including
generating interpolated wobble data;
decoding, at least partially, the interpolated wobble data to produced decoded wobble data;
determining a phase difference between the interpolated wobble data and the decoded wobble data; and
compensating the interpolated wobble data for the phase difference.

\* \* \* \* \*